United States Patent [19]

Schlüter

[11] Patent Number: 5,493,946

[45] Date of Patent: Feb. 27, 1996

[54] PNEUMATIC BOOSTER WITH SOLENOID AUXILIARY CONTROL, PARTICULARLY FOR MOTOR VEHICLE BRAKE SYSTEMS

[75] Inventor: Peter Schlüter, Kammerforst, Germany

[73] Assignee: Lucas Industries Public Limited Company, Solihull, United Kingdom

[21] Appl. No.: 383,372

[22] Filed: Feb. 3, 1995

[30] Foreign Application Priority Data

Feb. 17, 1994 [DE] Germany .......................... 44 05 092.5

[51] Int. Cl.⁶ .................................................... F15B 13/16
[52] U.S. Cl. ............................................ 91/367; 91/376 R
[58] Field of Search .................................. 91/367, 369.1, 91/369.2, 376 R

[56] References Cited

U.S. PATENT DOCUMENTS 5,172,964 12/1992 Levrai et al. ......................... 91/376 R

FOREIGN PATENT DOCUMENTS

0478396A1 4/1992 European Pat. Off. .
4211849A1 10/1993 Germany .
113966 4/1992 Japan ...................... 91/376 R

*Primary Examiner*—F. Daniel Lopez
*Attorney, Agent, or Firm*—Oblon, Spivak, McClelland, Maier & Neustadt

[57] ABSTRACT

In a booster housing (10) two chambers (12, 14) separated from each other by a movable wall (16) are connectable to each other by a control valve (20) having a valve body (22) axially movable in common with the wall (16), said valve body having a first valve seat (24), a sealing element (60) axially movable in said valve body and pretensioned in the direction of said first valve seat and a valve barrel (30). The valve barrel (30) has a second valve seat (32) and is pretensioned in the direction of the sealing element (60), is couplingly connected for movement by means of a piston (42) movable by an actuator element (44) in the direction away from the sealing element (60) and is movable by means of a solenoid (40) also independently of the piston (42). Between said valve barrel (30) and said piston (42) an axially effective seal (56) is disposed so that it will only seal when an abutment (55) formed on said valve barrel (30) is in contact at least more or less with a coupling element (54) formed on said piston (42).

4 Claims, 4 Drawing Sheets

PNEUMATIC BOOSTER WITH SOLENOID AUXILIARY CONTROL, PARTICULARLY FOR MOTOR VEHICLE BRAKE SYSTEMS

TECHNICAL FIELD

The present invention relates to a pneumatic booster with solenoid auxiliary control, particularly for motor vehicle brake systems according to the preamable of claim 1.

BACKGROUND OF THE INVENTION

In a known brake booster of the kind specified (DE-A 42 11 849 A1) the stopper element is secured to the piston and extends outwardly through radial recesses of the valve barrel and valve body in alignment with each other where it coacts with a stopper formed on the booster housing. The recess of the valve barrel is dimensioned so that its resting position is dictated by the valve barrel being in direct contact with the stopper element. The seal interposed between valve barrel and piston is a lip-type seal held in an annular groove of the piston and, irrespective of the position of the valve barrel with respect to the piston, is in sealing contact with a cylindrical inner wall of the valve barrel. This results in friction with the drawback that solenoid actuation of the valve barrel as well as its subsequent return to its rest position are obstructed. Reliable return of the valve barrel to its rest position following exclusively solenoid actuation, i.e. with the piston halted in its rest position necessitates powerful dimensioning of the return spring which, in turn, together with the aforementioned friction forces makes solenoid actuation of the valve barrel difficult. This is why the solenoid also needs to be dimensioned powerfully which adds to its space requirement—already substantial in the cramped space availability within the booster —still further, and also results in heat dissipation problems due to the added current consumption of the solenoid.

In another known brake booster of the kind specified (EP 0 478 396 A1) the piston is configured with a coupling element which in the rest position of the piston is axially spaced away from an abutment assigned to it and is formed on the valve barrel. In mechanical actuation of the brake booster the piston must thus be shifted forwards by a certain distance before its coupling element comes up against the abutment of the valve barrel and reliably coupling it into the movement. It may, however, also happen that the valve barrel is coupled into the movement right from the start by friction transmitted from the piston via the seal to the valve barrel. Although this has no damaging effect, here too, the friction has the drawback already described.

The invention is thus based on the object of maintaining the solenoid forces required in a pneumatic booster with solenoid auxiliary control as low as possible.

This object is achieved according to the invention by the features of claim 1.

SUMMARY OF THE INVENTION

The invention is based on the realization that a seal between piston and valve barrel is only necessary as long as both are in their rest position, this being the reason why it is sufficient to provide only an axially effective seal between piston and valve barrel; it being acceptable that this seal instantly loses its effect when the valve barrel leaves its rest position due to solenoid actuation, whilst the piston remains in its rest position.

The exclusive dependency of the rest position of the valve barrel on that of the piston, as specified in claim 2, has the advantage that the sealing effect of the seal between piston and valve barrel does not depend on production and assembly tolerances of other components, particularly those of the stopper element.

In the claims 3 and 4 two alternative aspects of the invention are described.

BRIEF DESCRIPTION OF THE DRAWINGS

Example embodiments of the invention will now be explained in the following with reference to the schematic drawings showing further details, in which.

DETAILED DESCRIPTION

Figure 1:
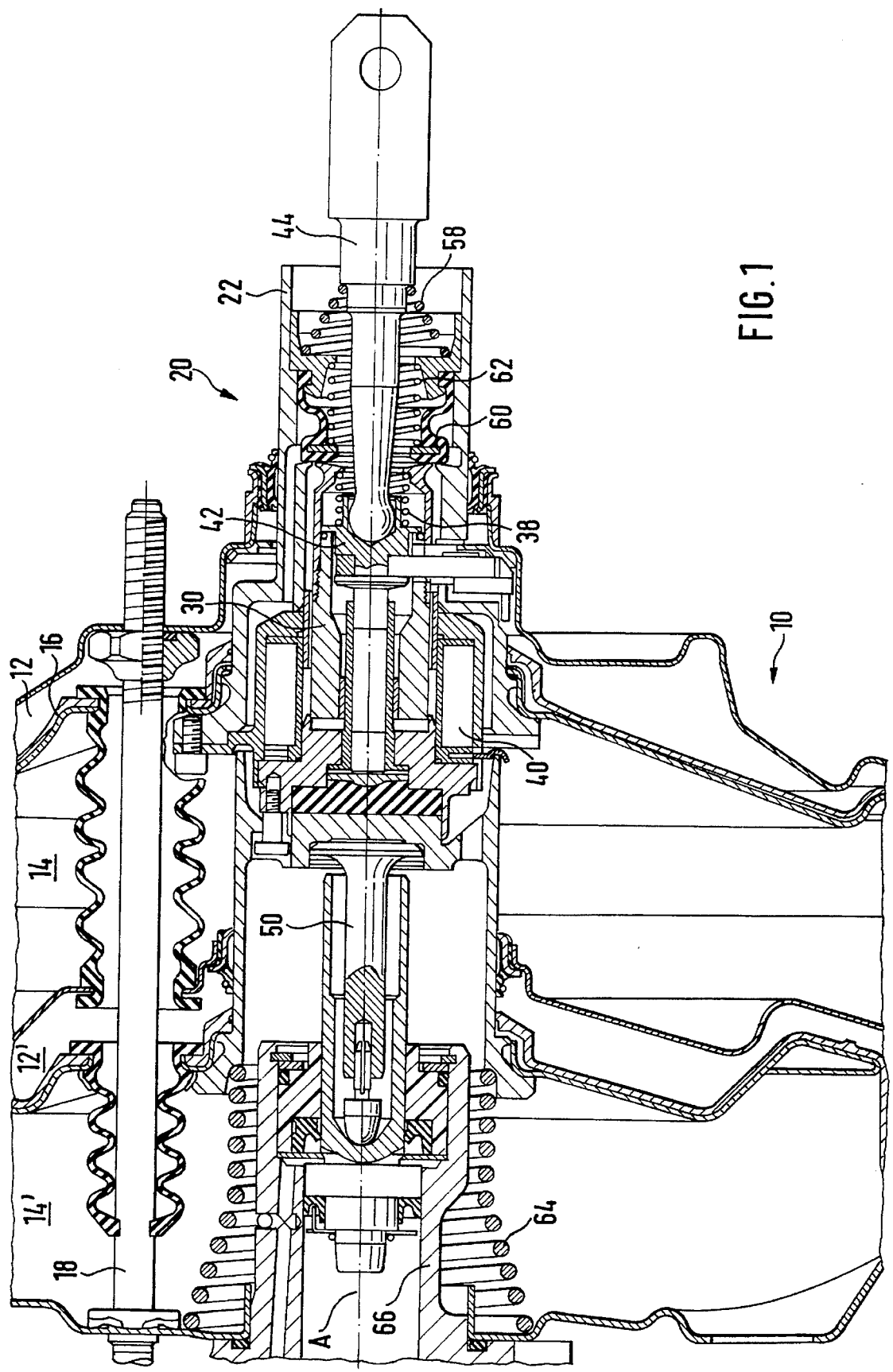
FIG. 1 is an axial section through a pneumatic brake booster with solenoid auxiliary
Figure 2:
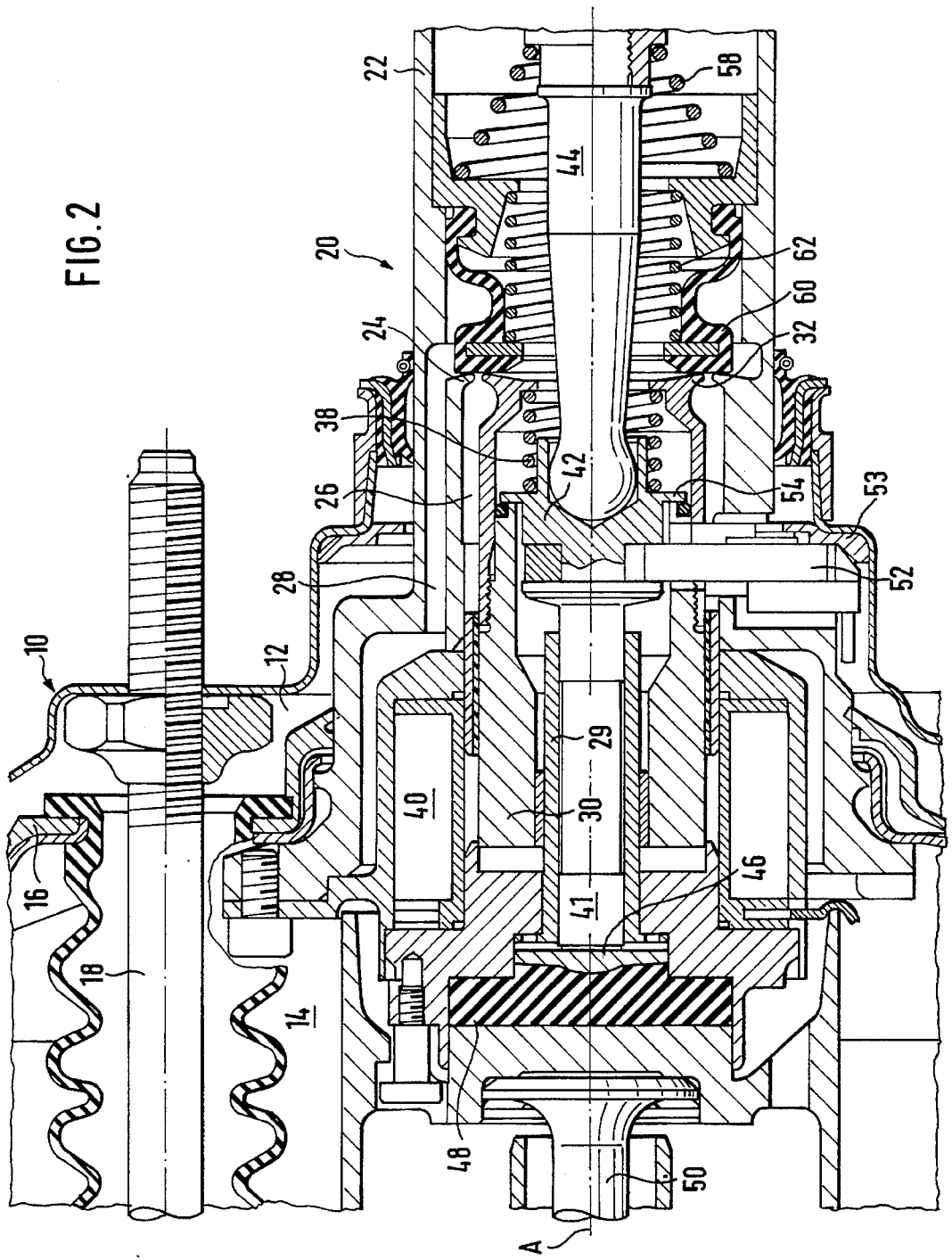
FIG. 2 is an enlarged partial view of FIG. 1.
Figure 3:
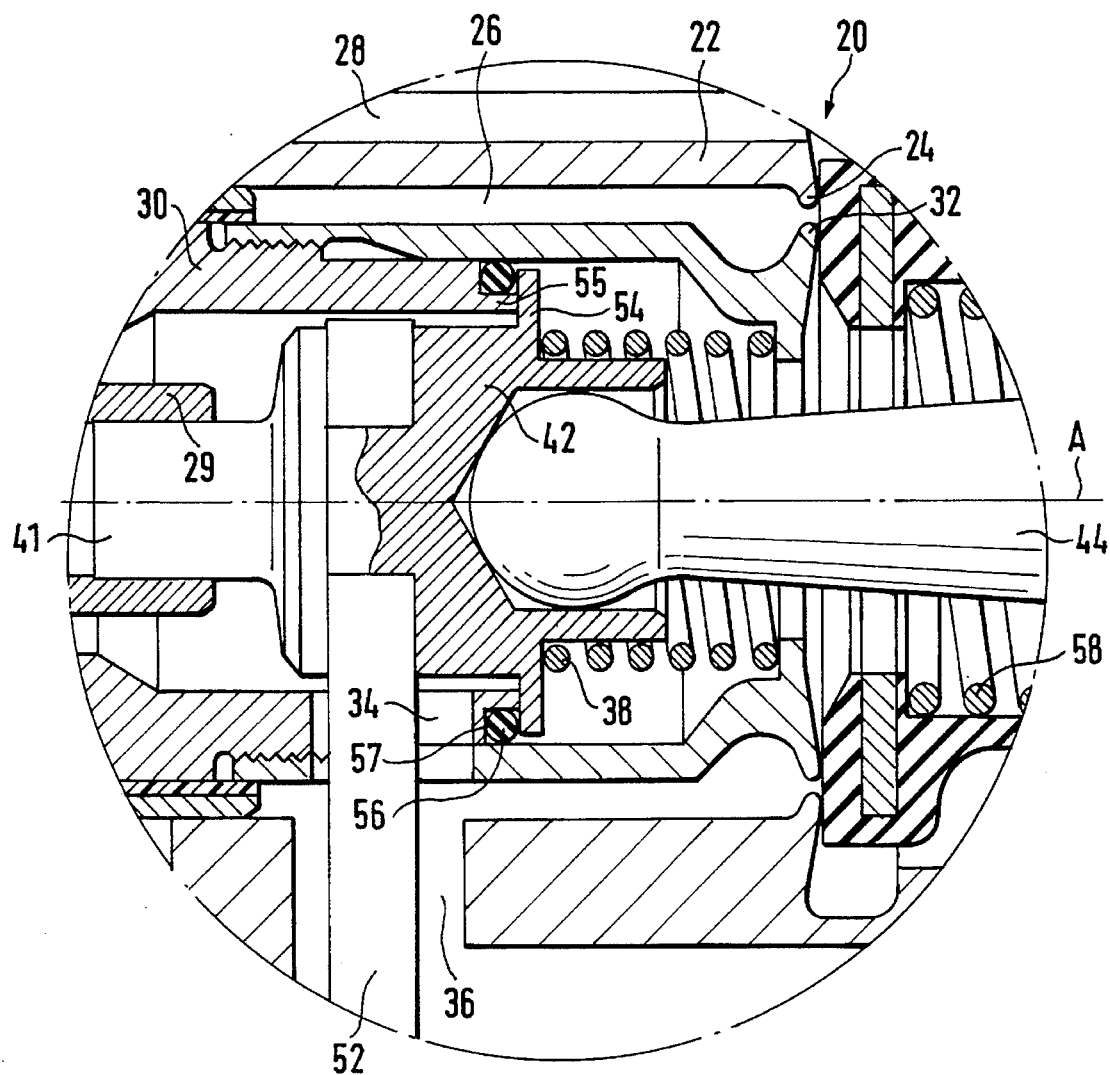
FIG. 3 is yet a further enlarged partial view of FIG. 2.

The brake booster illustrated in FIGS. 1 to 3 is substantially rotationally syymetrical with reference to an axis A which normally agrees with the longitudinal direction of the vehicle when installed in a motor vehicle. As shown in FIG. 1 the brake booster is of tandem design having a booster housing 10, a first chamber 12 and a second chamber 14, which are separated from each other by a movable wall 16, as well as a first additional chamber 12' and a second additional chamber 14', which are separated from each other by a movable wall 16'. The booster housing 10 is held together by a parallel-axis arrangement of tension rods, of which only one is illustrated. There is no need to detail special features resulting from the tandem design, since these are known; it being sufficient to comment that the first chamber 12 is permanently connected to the first additional chamber 12', and the second chamber 14 is permanently connected to the second additional chamber 14'.

Associated with the brake booster is a control valve 20 which is incorporated in the main in the booster housing 10 and has with reference thereto an axially movable valve body 22. In the interior of the valve body 22 an annular first valve seat 24 is formed which separates a passage 26 merging into the rear chamber 12 from a passage 28 merging into the front chamber 14. The valve body 22 has further an axial bore in which a central sleeve 29 is disposed secured to the valve body 22. In the axial bore and on the sleeve 29 a sleeve-shaped valve barrel 30 is slidingly guided along the axis A. The valve barrel 30 is composed of front and rear components which are bolted together as shown in FIG. 1. At the rear end of the rear component (shown on the right in the drawing) of the valve barrel 30 a second valve seat 32 is formed concentric to the first valve seat 24.

Spaced upstream from the second valve seat 32 (shown on the left in the drawing) the valve barrel 30 has a radial recess 34 which joins another radial recess 36 configured wider, however, in the axial direction in the valve body 22. The valve barrel 30 is permanently urged to the rear (to the right in FIGS. 1 to 3) by an axially preloaded valve spring 38. In the control valve 20 a solenoid 40 is incorporated which is assigned to the left-hand component of the valve barrel 30 as the solenoid armature such that the valve barrel 30 is drawn forwards against the resistance of the valve spring 38 when the solenoid 40 is energized.

In the central sleeve 29 a piston rod 41 of a piston 42 is guided which at its rear end is connected to a rod-shaped actuating element 44 and having at its front end a piston head 46. The latter forms together with a rubber element 48 embedded in the valve body 22 and a booster output member 50 arranged in front thereof, a mechanical force translation means of the usual kind in brake boosters.

In an annual groove of the piston 42 a stopper element 52 is latched in such a way that it is connected to the piston for common axial movement. The stopper element 52 extends radially outwards through the recesses 34 and 36 in the valve barrel 30 and valve body 22 respectively and in the illustrated rest position of the piston 42 is in contact with a stopper 53 which is formed on a shoulder of the booster housing 10 and is thus independent of the position of the valve body 22.

Spaced away from the rear of the stopper element 52 a flange-like coupling element 54 is formed which in the illustrated rest position of the piston 42 and of the valve barrel 30 is in contact with an annular abutment 55 formed on the valve barrel. The valve spring 38, resulting in this contact, is totally disposed within the valve barrel 30 and tensioned between the second valve seat 32 and the piston 42.

Radially outwards from the abutment 55 an annular seal 56 is disposed, located in an annular recess 57 formed open to the rear end in the piston 42 and which in the illustrated rest position seals off the coupling element 54 of the piston 42. The effective diameter of the seal 56 is, as shown in FIGS. 1 to 3, slightly smaller than the effective diameter of the second valve seat 32. The region downstream of the seal 56 (on the right in the drawing) is continuously exposed to atmospheric pressure. In the illustrated rest position of the valve barrel 30 the seal 56 prevents the atmosphere from gaining access to the rear chamber 12 via the valve barrel 30 and the recesses 34 and 36.

By means of a rear return spring 58 the actuator element 44 is normally maintained in its illustrated rest position in which an annular sealing element 60 disposed within the valve body 22 in the usual way and pretensioned forwardly by a spring 62 has sealing contact with the first valve seat 24, whilst not providing a total seal of the second valve seat 32, a slight difference in pressure existing between the two chambers 12 and 14. In operation the front chamber 14 is permanently connected to a vacuum source, as a result of which a vacuum exists in both chambers 12 and 14 in the rest position of the valve barrel 30. The moving wall 16 and the valve body 22 connected thereto in common axial movement thereof are urged into their rear final position, as shown, by a front return spring 64.

In idle condition the stopper element 52 is in contact with the stop 53, thereby defining the rest position of the piston 42. The valve barrel 30 is supported by the coupling member 54 with practically all of the force exerted by the valve spring 38 clamped between the valve barrel and the piston 42, thereby also defining the rest position of the valve barrel 30, the second valve seat 32 being maintained in contact with the sealing element 60 by a slight residual force of the valve spring 38.

On forward displacement of the actuator element 44, which for instance is connected to the brake pedal of a vehicle, thus producing forward displacement of the piston 42, the coupling member 54 thereof includes displacement of the abutment 55 and thus of the valve barrel 30 as a whole so that its valve seat 32 is released from the sealing element 60, allowing the downstream flow of atmosphere into the valve body 22 to access the rear chamber 12 through the passage 26 and further through the radial recess 36 in the valve body 22. The front chamber 14 is separated from the rear chamber 12, since the sealing element 60 is maintained firmly in contact with the first valve seat 24, thereby resulting in a difference in pressure between the two chambers 12 and 14 which causes the movable wall 16 together with the valve body 22 and the booster output member 50 to be displaced forwardly. The booster output member 50 transfers the force acting on it to a brake master cylinder 66, the rear end area of which is illustrated in FIG. 1.

If the forward movement of the valve barrel 30, affected mechanically via the piston 42, and the attendant booster output to the brake master cylinder 66 need to be accelerated and amplified, the solenoid 40 is energized so that it draws the valve barrel 30 away from the coupling element 54 forwards, thereby increasing the clear flow cross-section between the second valve seat 32 and the sealing element 60. Such a boosted output of the brake booster may for instance be desirable when the vehicle being decelerated is heavily loaded or when particularly fast forward movement of the actuator element 44 indicates that braking action is wanted on an emergency.

In these instances the solenoid 40 receives current via a controller with which an acceleration sensor monitoring the actuator element 44 is associated. Instead of this or additionally the power supply of the solenoid 40 may be controlled by a distance sensor which triggers braking action without the driver of the motor vehicle being involved, when the distance away of a vehicle driving ahead violates a specific minimum. In the latter case the control causes, via the solenoid 40, to be moved forward, thus allowing an inflow of atmosphere into the first chamber, even in the absence of a mechanical actuation, i.e. the piston 42 remaining in its rest position.

In any case, on de-energization of the solenoid 40 the valve barrel 30 is again urged rearwards by the valve spring 38 so that the abutment 55 is returned in contact with the coupling element 54 and the seal 56 is again effective. On completion of a mechanical force input via the actuator element 44 the piston 42 together with the valve barrel 30 returns to the rest position. The movable wall 16 and the valve body 22 fail to be involved in this return movement as long as a difference in pressure exists between the chambers 12 and 14. This difference in pressure is depleted by the valve barrel 30 urging the sealing element 60 a short distance to the rear so that it unseats from the first valve seat 24.

Figure 4:
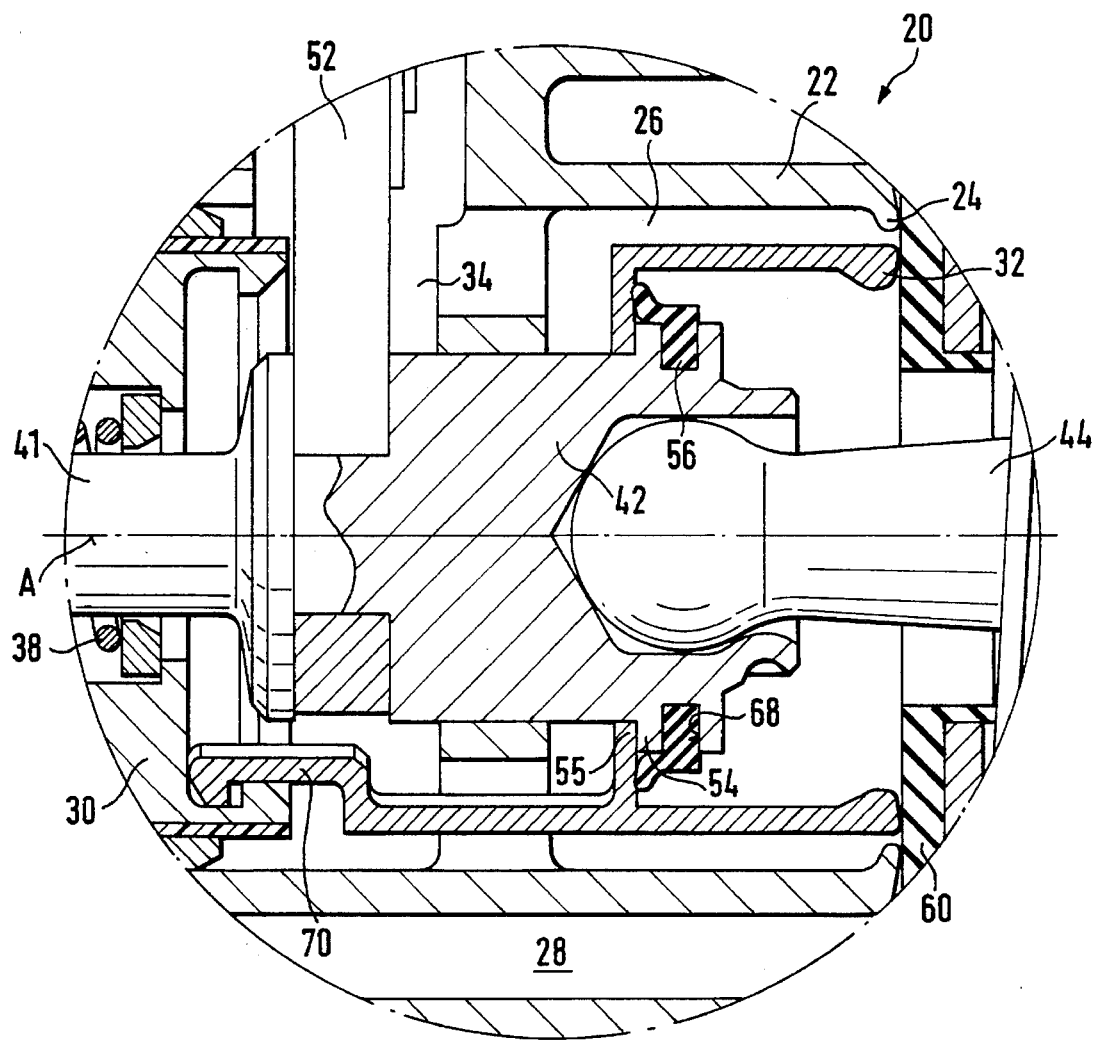
FIG. 4 a partial view of a deviation embodiment of the invention corresponding to FIG. 3.

The embodiment shown in FIG. 4 differs from that illustrated in FIGS. 1 to 3 primarily by the seal 56 being a lip-type seal which is seated in an annular recess 68 of the piston 42 and is radially open outwards, it protrudingly surrounding the coupling element 54 axially forward and sealing off the abutment 55 of the valve barrel 30. The rear component of the valve barrel 30 having the second valve seat 32 is not bolted to the front component of the valve barrel as shown in FIG: 4, but connected by spring latching fingers 70.

What is claimed is:

1. A pneumatic booster with solenoid auxiliary control, particularly for motor vehicle brake systems, having a booster housing (10) in which at least a first chamber (12) and a second chamber (14) are contained and are separated from each other by a movable wall (16), a valve body (22) which is connected to said movable wall (16) for common axial relative movement with reference to said booster housing (10) and having a first valve seat (24), a sealing element (60) arranged axially movable in said valve body (22) and pretensioned in the direction of said first valve seat (24), a piston (42) which is movable by means of an actuator element (44) axially away from said sealing element (60), a valve barrel (30) having a second valve seat (32) assigned to said sealing element (60), pretensioned in the direction of said sealing element (60), couplingly connected to said piston (42) for movement in the direction away from said sealing element (60) and also movable in the direction away from sealing element (6) by means of a solenoid (40) independently of said piston (42), a seal (56) between said valve barrel (30) and said piston (42), a stopper element (52) defining a common rest position of said piston (42) and said valve barrel (30) in which said first chamber (12) is sealed off from the inflow of air and is connected to said second chamber (14), and a passage (26) through which air flows into said first chamber (12) when said valve barrel (30) leaves its rest position, said sealing element (60) being in contact with said first valve seat (24) and discontinuing the connection between said two chambers (12, 14), characterized in that said seal (56) is axially effective between said valve barrel (30) and said piston (42) and disposed so that it will only seal when an abutment (55) formed on said valve barrel (30) is in contact at least more or less with a coupling element (54) formed on said piston (42).

2. The booster as set forth in claim 1, wherein said abutment (55) is disposed on said valve barrel (30) so that, in the rest position of said piston (42), it is in contact with said coupling element (54) thereof and thereby defining the rest position of said valve barrel (30) as a function of that of said piston (42).

3. The booster as set forth in claim 1 or 2, wherein said seal (56) is an O-ring located in an open-end annular recess (57) of said valve barrel (30) and seals off said coupling element (54).

4. The booster as set forth in claim 1 or 2, wherein said seal (56) is a lip-type seal located in a radially outwards open annular recess (68) of said piston (42), surrounding the coupling element (54) thereof in axial direction and sealing off said abutment (55).

* * * * *